US012578456B2

(12) United States Patent
Wu et al.

(10) Patent No.: US 12,578,456 B2
(45) Date of Patent: Mar. 17, 2026

(54) DEVICE AND METHOD FOR DETECTION

(71) Applicant: HTC Corporation, Taoyuan (TW)

(72) Inventors: Chun-Yih Wu, Taoyuan (TW);
Ta-Chun Pu, Taoyuan (TW);
Yen-Liang Kuo, Taoyuan (TW)

(73) Assignee: HTC Corporation, Taoyuan City (TW)

( * ) Notice: Subject to any disclaimer, the term of this patent is extended or adjusted under 35 U.S.C. 154(b) by 295 days.

(21) Appl. No.: 18/476,102

(22) Filed: Sep. 27, 2023

(65) Prior Publication Data

US 2025/0060474 A1 Feb. 20, 2025

(30) Foreign Application Priority Data

Aug. 17, 2023 (TW) ................................ 112130951

(51) Int. Cl.
*G01S 13/86* (2006.01)
*G01S 7/282* (2006.01)
*G06V 10/22* (2022.01)
*G06V 40/10* (2022.01)

(52) U.S. Cl.
CPC ............ *G01S 13/867* (2013.01); *G01S 7/282* (2013.01); *G06V 10/22* (2022.01); *G06V 40/107* (2022.01)

(58) Field of Classification Search
None
See application file for complete search history.

(56) References Cited

U.S. PATENT DOCUMENTS

| | | | | |
|---|---|---|---|---|
| 9,671,493 | B1 * | 6/2017 | Khosla | ................... G01S 13/867 |
| 10,572,024 | B1 * | 2/2020 | Saba | ........................ G01S 15/88 |
| 12,066,528 | B2 * | 8/2024 | Va | .......................... G01S 13/881 |
| 2014/0203959 | A1 * | 7/2014 | Kriel | ..................... G01S 13/867 342/52 |
| 2015/0346820 | A1 * | 12/2015 | Poupyrev | ................ G01S 7/411 345/156 |
| 2016/0041618 | A1 * | 2/2016 | Poupyrev | ................ G01S 7/415 342/61 |
| 2018/0046255 | A1 * | 2/2018 | Rothera | .................. B60K 35/80 |
| 2021/0174519 | A1 * | 6/2021 | Bazarevsky | .............. G06T 7/75 |
| 2021/0240274 | A1 * | 8/2021 | Schmalenberg | ...... G01S 13/583 |
| 2023/0007183 | A1 | 1/2023 | Kang et al. | |
| 2024/0185639 | A1 * | 6/2024 | Park | ..................... G01S 13/867 |

FOREIGN PATENT DOCUMENTS

TW 202231516 A 8/2022

* cited by examiner

*Primary Examiner* — Bernarr E Gregory

(74) *Attorney, Agent, or Firm* — Birch, Stewart, Kolasch & Birch, LLP

(57) ABSTRACT

A detection device for detecting an object includes a camera module, an image processing module, and a radar module. The camera module obtains an image of the object. The image processing module analyzes the image, so as to define the target sensing zone and generate a radar setting value. The radar module is controlled by the image processing module. The radar module is selectively operated in a first resolution mode or a second resolution mode. Initially, the radar module is operated in the first resolution mode. In the second resolution mode, the radar module detects a specific portion of the object within the target sensing zone according to the radar setting value.

16 Claims, 6 Drawing Sheets

400

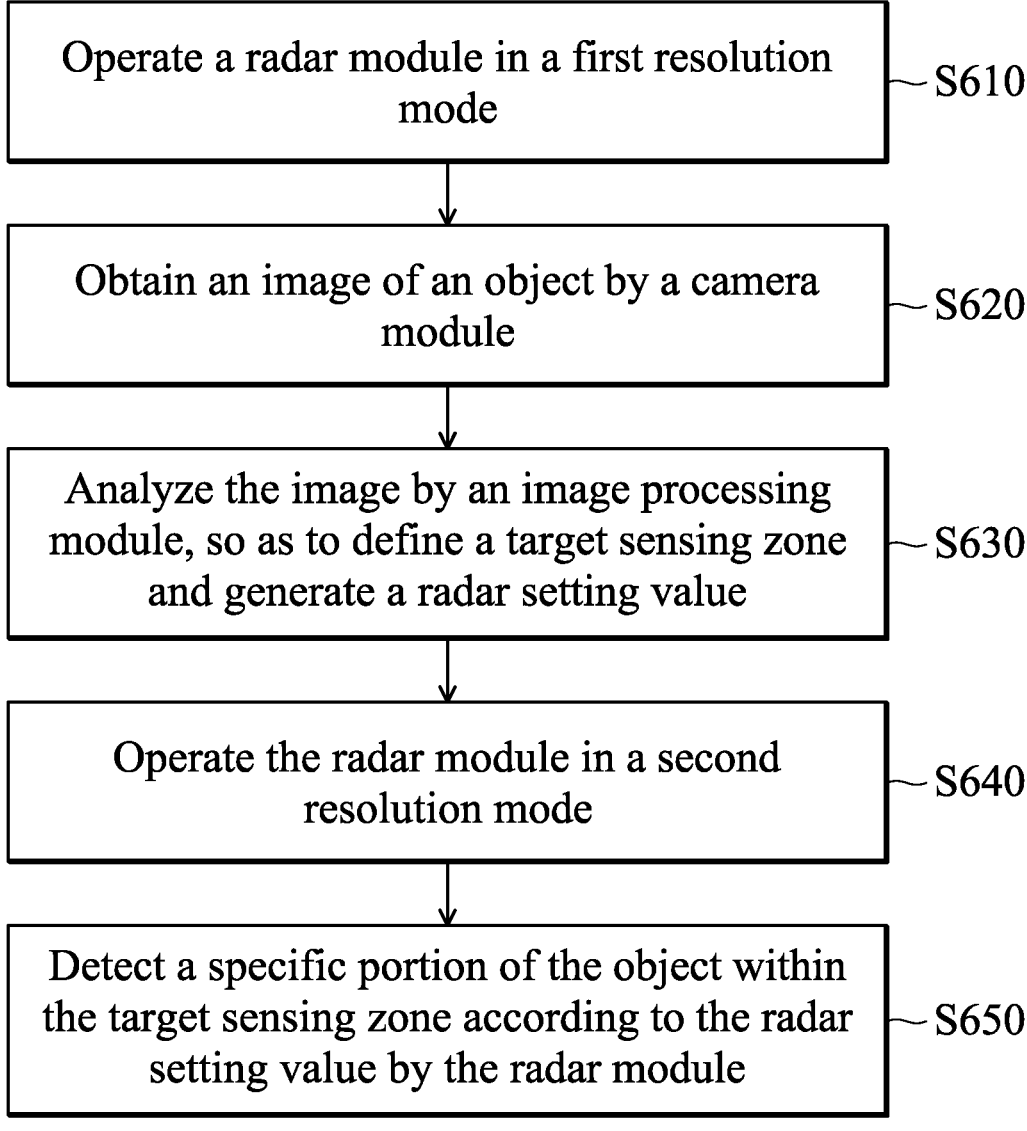

Operate a radar module in a first resolution mode ～S610

Obtain an image of an object by a camera module ～S620

Analyze the image by an image processing module, so as to define a target sensing zone and generate a radar setting value ～S630

Operate the radar module in a second resolution mode ～S640

Detect a specific portion of the object within the target sensing zone according to the radar setting value by the radar module ～S650

FIG. 6

DEVICE AND METHOD FOR DETECTION

CROSS REFERENCE TO RELATED APPLICATIONS

This application claims priority of Taiwan Patent Application No. 112130951 filed on Aug. 17, 2023, the entirety of which is incorporated by reference herein.

BACKGROUND OF THE INVENTION

Field of the Invention

The invention relates to a detection device, and more particularly, to a detection device and a detection method.

Description of the Related Art

Radar devices are common positioning components. However, when being applied in the fields of VR (Virtual Reality) or AR (Augmented Reality), conventional radar devices may easily have wrong targets, which reduce the overall detection accuracy. Accordingly, there is a need to propose a novel solution for solving the problem of the prior art.

BRIEF SUMMARY OF THE INVENTION

In an exemplary embodiment, the invention is directed to a detection device for detecting an object. The detection device includes a camera module, an image processing module, and a radar module. The camera module obtains an image of the object. The image processing module analyzes the image, so as to define a target sensing zone and generate a radar setting value. The radar module is controlled by the image processing module. The radar module is selectively operated in a first resolution mode or a second resolution mode. Initially, the radar module is operated in the first resolution mode. In the second resolution mode, the radar module detects a specific portion of the object within the target sensing zone according to the radar setting value.

In some embodiments, the detection device is implemented with an HMD (Head Mounted Display).

In some embodiments, the object is a human body, and the specific portion of the object is the hand portion of the human body.

In some embodiments, in the first resolution mode, if the radar module detects that anything is approaching, the radar module can notify the camera module, such that the camera module can be enabled.

In some embodiments, the frame rate of the camera module is lower than or equal to a predetermined value.

In some embodiments, in the first resolution mode, the PRT (Pulse Repetition Time) of the radar module is greater than or equal to a threshold value.

In some embodiments, in the second resolution mode, the PRT of the radar module is smaller than the threshold value.

In some embodiments, after the image processing module finishes analyzing the image, the image processing module controls the radar module to leave the first resolution mode and enter the second resolution mode.

In some embodiments, the target sensing zone corresponds to a cuboid region.

In some embodiments, the radar setting value includes an antenna angle setting value and a PRT setting value.

In some embodiments, the radar module includes an antenna array and a radar controller. The antenna array includes a plurality of antenna elements. The radar controller controls the tilt angle of the antenna array according to the radar setting value.

In another exemplary embodiment, the invention is directed to a detection method that includes the following steps. The radar module operates in the first resolution mode. The camera module obtains an image of an object. The image is analyzed by the image processing module to define the target sensing zone and to generate a radar setting value. The radar module is operated in the second resolution mode. The radar module detects a specific portion of the object within the target sensing zone based on the radar setting value.

In some embodiments, the detection method further includes: in the first resolution mode, if it is detected that anything is approaching, notifying the camera module by the radar module, such that the camera module is enabled.

In some embodiments, the detection method further includes: after the image is completely analyzed, controlling the radar module to leave the first resolution mode and enter the second resolution mode by the image processing module.

BRIEF DESCRIPTION OF DRAWINGS

The invention can be more fully understood by reading the subsequent detailed description and examples with references made to the accompanying drawings, wherein:

FIG. 6 is a flowchart of a detection method according to an embodiment of the invention.

DETAILED DESCRIPTION OF THE INVENTION

Figure 1:
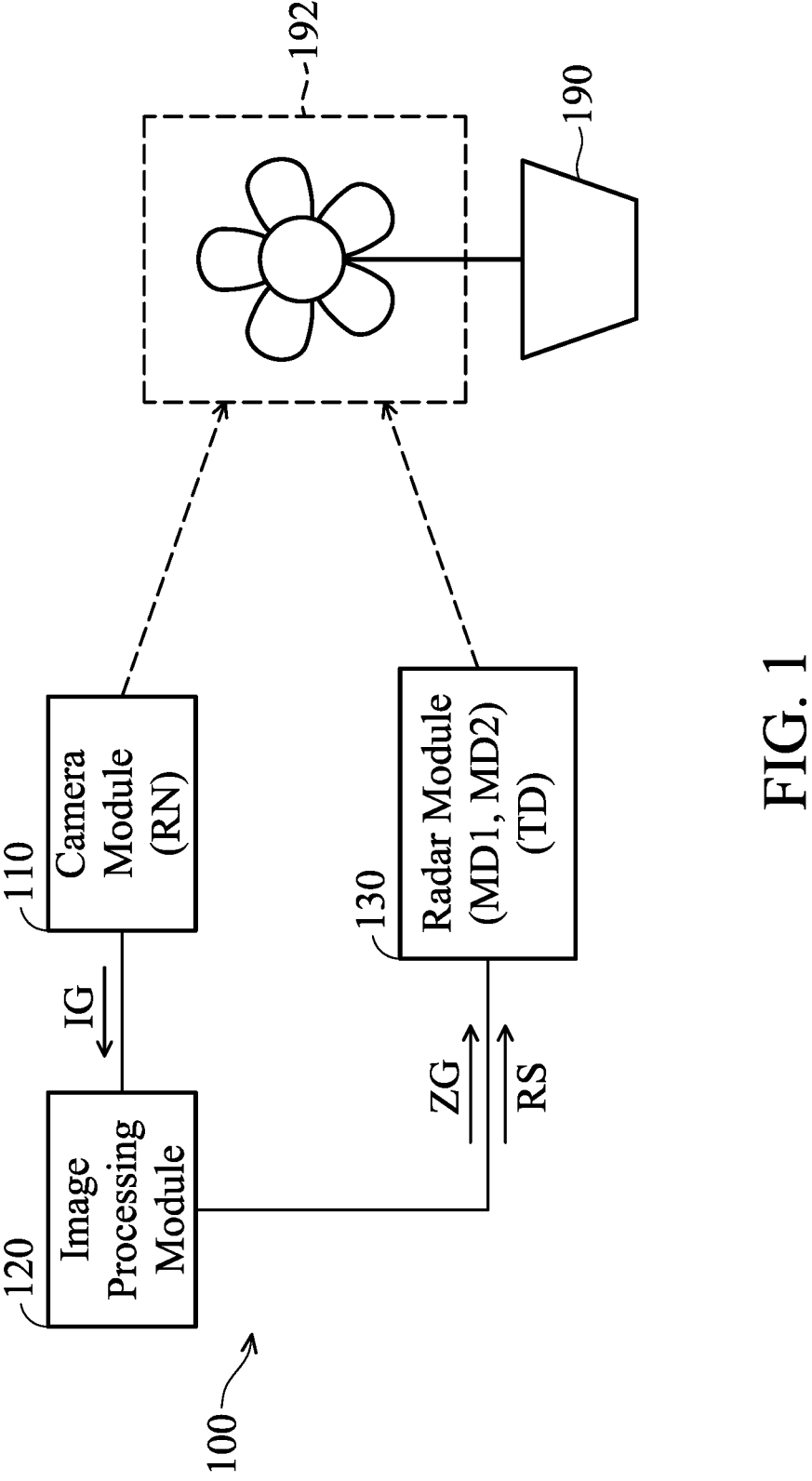
FIG. 1 is a diagram of a detection device according to an embodiment of the invention.

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a detection device 100 according to an embodiment of the invention. The detection device 100 may be applied to an HMD (Head Mounted Display) or a mobile device, such as an AR (Augmented Reality) glasses, a smart phone, a tablet computer, or a notebook computer, but it is not limited thereto. In the embodiment of FIG. 1, the detection device 100 at least includes a camera module 110, an image processing module 120, and a radar module 130. It should be understood that the detection device 100 may further include other components, such as a housing, a speaker, and/or a power supply module, although they are not displayed in FIG. 1.

In some embodiments, the detection device 100 is configured to detect an object 190. The type of the object 190 is not limited in the invention. For example, the object 190 may be a human body or a conductor. Alternatively, the object 190 may be an insulator. It should be noted that the object 190 is not any portion of the detection device 100.

The shape and type of the camera module 110 are not limited in the invention. The camera module 110 is configured to obtain an image IG of the object 190. In order to reduce the power consumption, the frame rate RN of the camera module 110 may be lower than or equal to a predetermined value. For example, the predetermined value may be substantially equal to 10 Hz, but it is not limited thereto.

The image processing module 120 is coupled to the camera module 110. Specifically, the image processing module 120 is configured to receive and analyze the image IG, so as to define a target sensing zone ZG and generate a radar setting value RS. After the image IG is completely analyzed, the image processing module 120 can determine an important portion of the image IG, and the important portion can correspond to the target sensing zone ZG. Thus, in an image scene mode which is defined according to the content of the image IG, the aforementioned important portion may refer to a representative portion of the image IG, such as the flower portion in an image of a potted flower, or a gesture in an image of a hand and arm, but it is not limited thereto. Next, the target sensing zone ZG is used to indicate a specific portion of the object 190. If the upper portion of the image IG is more important than its other portions, the target sensing zone ZG generated by the image processing module 120 can correspondingly indicate an upper portion of the object 190 (which may be inside a dashed box 192 of FIG. 1). For example, the relative information of the target sensing zone ZG may be transmitted to the radar module 130 in the form of a wired signal or a wireless signal. Furthermore, in some embodiments, the radar setting value RS, which is defined by the image scene mode of the invention, includes an antenna angle setting value and a PRT (Pulse Repetition Time) setting value, but it is not limited thereto.

The radar module 130 is coupled to the image processing module 120. The radar module 130 is controlled by the image processing module 120. Specifically, the radar module 130 can be selectively operated in a first resolution mode MD1 or a second resolution mode MD2. For example, the first resolution mode MD1 may provide a rough detection result, and the power consumption of the radar module 130 may be relatively low. Conversely, the second resolution mode MD2 may provide an accurate detection result, and the power consumption of the radar module 130 may be relatively high. Initially, the radar module 130 can be operated in the first resolution mode MD1. If a certain condition is met, the radar module 130 can leave the first resolution mode MD1 and enter the second resolution mode MD2. In the second resolution mode MD2, the radar module 130 can detect a specific portion of the object 190 within the target sensing zone ZG according to the radar setting value RS. The image processing module 120 may provide the relative information of the target sensing zone ZG for the radar module 130.

In some embodiments, initially, the camera module 110 is disabled or in a sleep mode for saving electric power. In the first resolution mode MD1, if the radar module 130 detects that anything is approaching (it is not limited to the object 190), the radar module 130 can notify the camera module 110, so that the camera module 110 can be enabled. For example, if anything falls within a detectable range of the radar module 130, the radar module 130 may determine a near event occurring, so as to enable the camera module 110. Alternatively, the image processing module 120 may enable the camera module 110 after the radar module 130 notifies the image processing module 120, but it is not limited thereto. In alternative embodiments, if the detection device 100 is picked up from a table by a user, the camera module 110 will be enabled or waked up.

In some embodiments, the radar module 130 is continuously operated in the first resolution mode MD1 until the radar module 130 receives the notification from the image processing module 120. For example, after the image processing module 120 finishes analyzing the image IG, the target sensing zone ZG may be defined and the radar setting value RS may be generated. At this time, the image processing module 120 can control the radar module 130 to leave the first resolution mode MD1 and enter the second resolution mode MD2, but it is not limited thereto.

With the design of the invention, the proposed detection device 100 uses the camera module 110 and the image processing module 120 to find out the target sensing zone ZG, and then uses the radar module 130 to detect the specific portion of the object 190 within the target sensing zone ZG. It should be understood that the image processing module 120 usually consumes more electric power than the radar module 130 does. Therefore, the proposed detection device 100 configures the radar module 130 as a final detection tool, thereby significantly reducing the overall power consumption of the detection device 100. In addition, because the target sensing zone ZG is defined by the image processing module 120, the design of the invention also helps to reduce the probability of the radar module 130 selecting the wrong target.

The following embodiments will introduce different configurations and detail the structural features of the detection device 100. It should be understood that these figures and descriptions are merely exemplary, rather than limitations of the invention.

Figure 2:
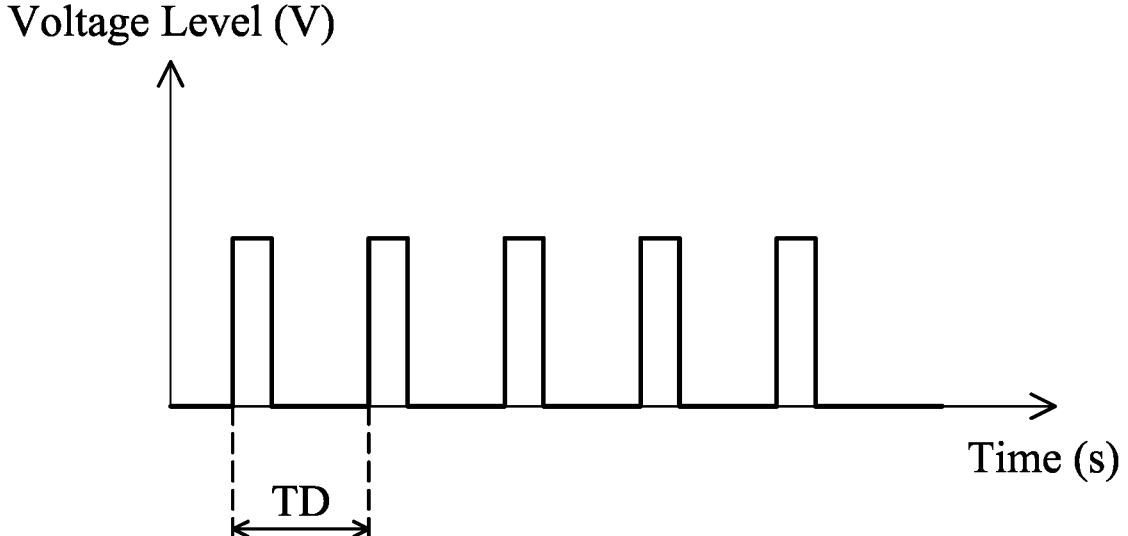
FIG. 2 is a diagram of a waveform of pulses of a radar module according to an embodiment of the invention.

FIG. 2 is a diagram of a waveform of pulses of the radar module 130 according to an embodiment of the invention. The horizontal axis represents time(s), and the vertical axis represents a voltage level (V). The radar module 130 can continuously generate a plurality of pulses. The interval between the transmission time points of any two adjacent pulses can be considered as a PRT TD of the radar module 130. In the first resolution mode MD1, the PRT TD of the radar module 130 is greater than or equal to a threshold value. Furthermore, the distance resolution and the sampling rate of the radar module 130 are reduced. On the contrary, in the second resolution mode MD2, the PRT TD of the radar module 130 is smaller than the threshold value, and the distance resolution and the sampling rate of the radar module 130 are greater than the corresponding values in the first resolution mode MD1. For example, the threshold value may be substantially equal to 1 or 2 seconds, but it is not limited thereto.

Figure 3:
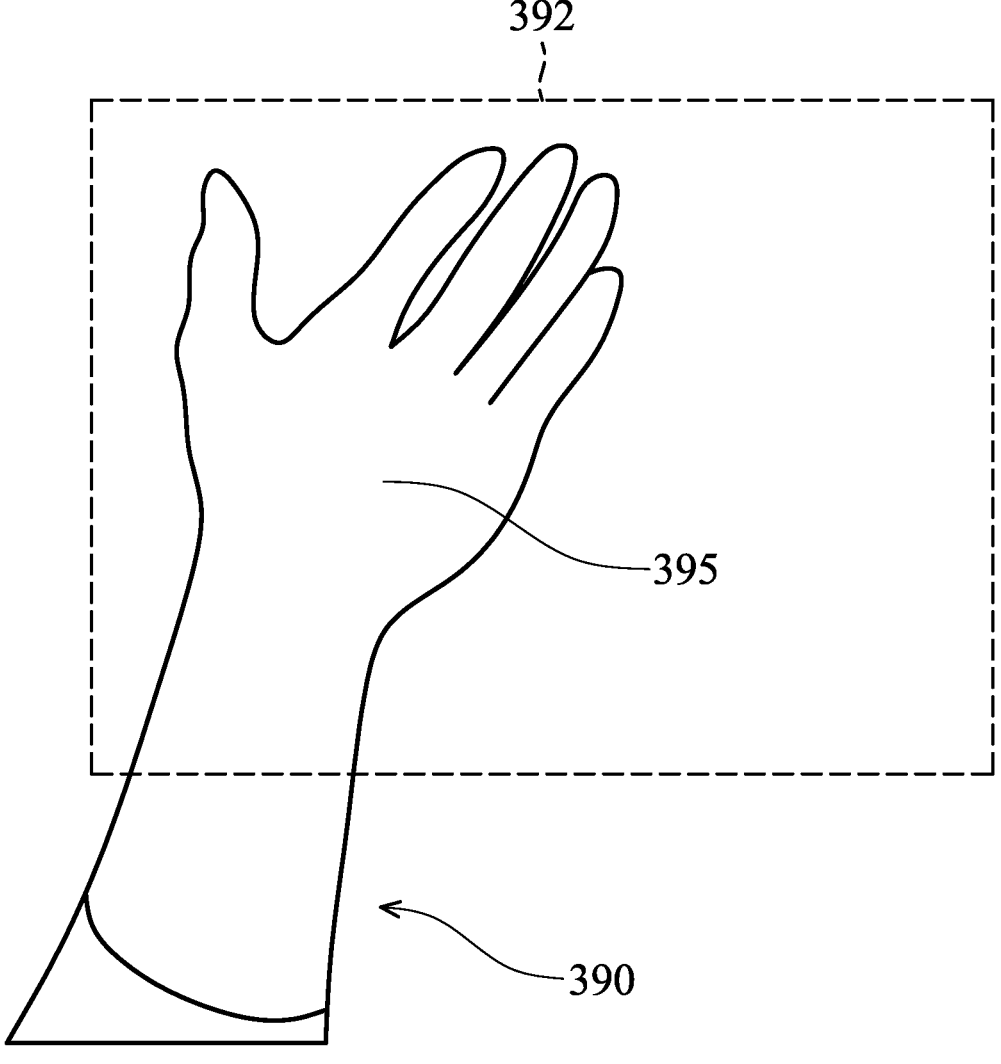
FIG. 3 is a diagram of an object according to an embodiment of the invention.

FIG. 3 is a diagram of an object 390 according to an embodiment of the invention. In the embodiment of FIG. 3, the object 390 is a human body, and a specific portion 395 of the object 390 is inside a dashed box 392, which is indicated by the target sensing zone ZG. For example, the specific portion 395 of the object 390 may be a hand portion of the human body (e.g., a loader or another user), but it is not limited thereto. On the other hand, the other portions outside the dashed box 392 are considered as a non-detection zone. In some embodiments, the radar module 130 does not perform any detection process on the aforementioned non-detection zone, thereby saving its calculation resources.

In some embodiments for detecting a gesture of a hand portion, the radar module 130 is operated as follows. The IF (Intermediate Frequency) operational bandwidth of the radar module 130 may be 6 GHz. The detectable distance resolution of the radar module 130 may be about 2.5 cm. If the central frequency of the radar module 130 is at 60 GHz, a wavelength of the radar module 130 may be substantially equal to 5 mm. Also, if the PRT TD of the radar module 130 is set to 0.5 ms, the maximum sensing speed of the radar module 130 may be 2.5 m/s. Based on a 64-point discrete Fourier sampling operation, the speed resolution of the radar module 130 may be about 0.08 m/s. If the number of sampling points directed to each chirp signal of the radar module 130 is equal to 64, the maximum unambiguous range of the radar module 130 may be about 0.8 m, which may be substantially equal to the length of the arm of the user. Specifically, the above operations and calculations may be described as the following equations:

$$QA = \frac{c}{2 \cdot BW} \tag{1}$$

$$QB = \frac{WL}{4 \cdot TD} \tag{2}$$

$$QC = \frac{WL}{2 \cdot SN \cdot TD} \tag{3}$$

$$QD = \frac{SN \cdot QA}{2} \tag{4}$$

where "QA" represents the radar wave resolution of the radar module 130, "QB" represents the maximum sensing speed of the radar module 130, "QC" represents the speed resolution of the radar module 130, "QD" represents the maximum unambiguous range of the radar module 130, "c" represents the speed of light, "BW" represents the IF operational bandwidth of the radar module 130, "WL" represents the wavelength of the radar module 130, "TD" represents the PRT TD of the radar module 130, and "SN" represents the number of sampling points of the radar module 130 (e.g., 64).

Figure 4:
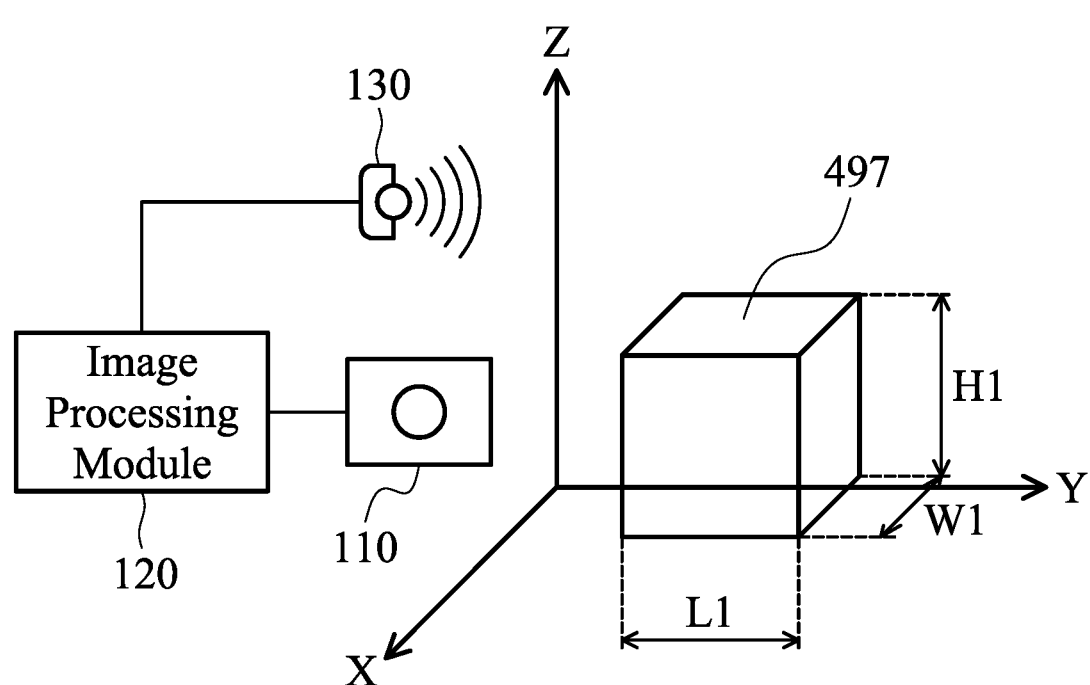
FIG. 4 is a diagram of a detection device according to an embodiment of the invention.

FIG. 4 is a diagram of a detection device 400 according to an embodiment of the invention. In the embodiment of FIG. 4, the target sensing zone ZG defined by the image processing module 120 corresponds to a cuboid region 497 in coordinate space. That is, the radar module 130 can detect a specific portion of an object (not shown) inside the cuboid region 497. In addition, the length L1, the width W1, the height H1, the X-coordinate, the Y-coordinate, and the Z-coordinate of the cuboid region 497 can be considered as the relative information of the target sensing zone ZG. All of the relative information of the target sensing zone ZG can be transmitted from the image processing module 120 to the radar module 130.

Figure 5:
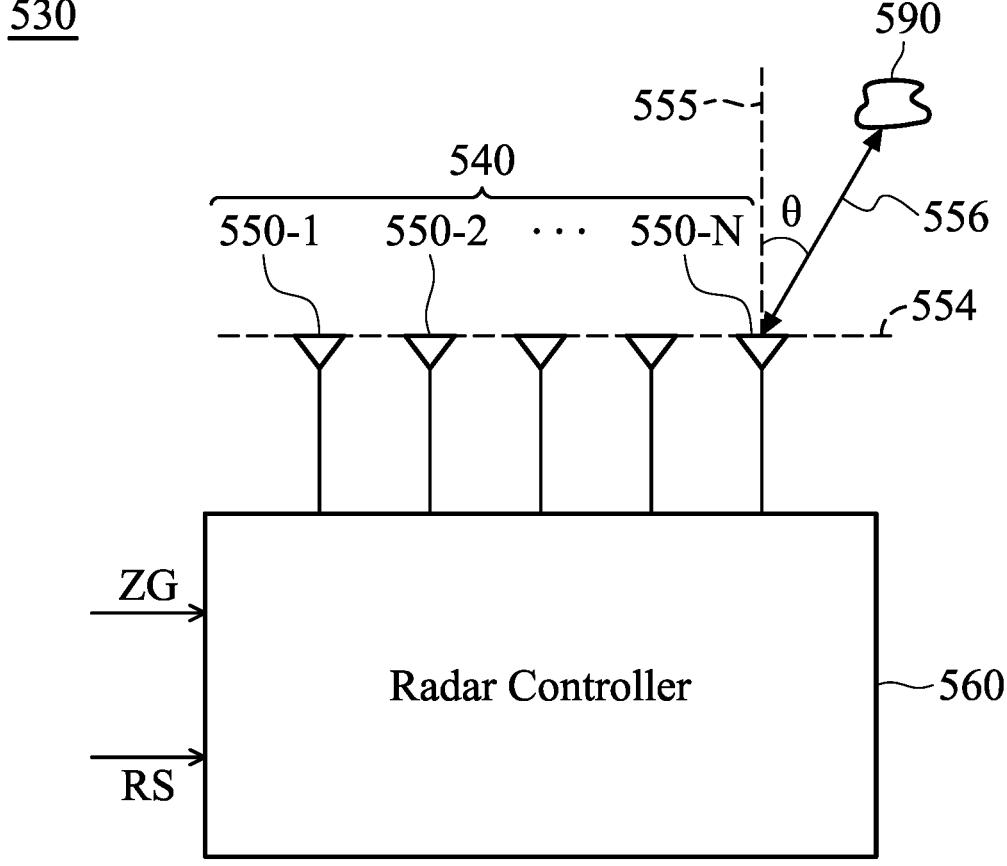
FIG. 5 is a diagram of a radar module according to an embodiment of the invention.

FIG. 5 is a diagram of a radar module 530 according to an embodiment of the invention. In the embodiment of FIG. 5, the radar module 530 includes an antenna array 540 and a radar controller 560. Specifically, the antenna array 540 includes a plurality of antenna elements 550-1, 550-2, . . . , and 550-N, where "N" is any positive integer greater than or equal to 2. For example, the antenna elements 550-1, 550-2, . . . , and 550-N may be arranged on the same radar plane 554. The radar plane 554 has a normal line 555. There is a connection line 556 between the radar plane 554 and an object 590. The tilt angle θ of the antenna array 540 can be defined by the normal line 555 and the connection line 556 as mentioned above. Also, the radar controller 560 can control and adjust the tilt angle θ of the antenna array 540 according to the radar setting value RS, so that the main beam of the radiation pattern of the antenna array 540 can be exactly toward the specific portion of the object 590 corresponding to the target sensing zone ZG. More particularly, the radar controller 560 can selectively enable or disable at least one of the antenna elements 550-1, 550-2, . . . , and 550-N of the antenna array 540 according to the radar setting value RS, thereby achieving better detection performance. It should be understood that the radar controller 560 may include other components, such as a pulse generator, a signal feeding element, and/or a phase shifter, although they are not displayed in FIG. 5.

FIG. 6 is a flowchart of a detection method according to an embodiment of the invention. To begin, in step S610, a radar module is operated in a first resolution mode. In step S620, an image of an object is obtained by a camera module. In step S630, the image is analyzed by an image processing module, so as to define a target sensing zone and generate a radar setting value. In some embodiments, if the image processing module or the radar module determines that the target sensing zone and the radar setting value are not good enough, the procedure may go back to step S620, so that the image of the object can be obtained again for the following analysis. In step S640, the radar module is operated in a second resolution mode. Finally, in step S650, a specific portion of the object within the target sensing zone is detected according to the radar setting value by the radar module. It should be understood that these steps are not required to be performed in order, and every feature of the embodiments of FIGS. 1 to 5 may be applied to the detection method of FIG. 6.

The invention proposed a novel detection device and a novel detection method. In comparison to the conventional design, the invention has at least the advantages of enhancing the detection accuracy and reducing the overall power consumption. Therefore, the invention is suitable for application in a variety of devices.

Note that the above element parameters are not limitations of the invention. A designer can fine-tune these setting values according to different requirements. It should be understood that the detection device and detection method of the invention are not limited to the configurations of FIGS. 1-6. The invention may include any one or more features of any one or more embodiments of FIGS. 1-6. In other words, not all of the features displayed in the figures should be implemented in the detection device and detection method of the invention.

The method of the invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A detection device for detecting an object, comprising:
a camera module, obtaining an image of the object;
an image processing module, analyzing the image, so as to define a target sensing zone and generate a radar setting value; and
a radar module, controlled by the image processing module, wherein the radar module is selectively operated in a first resolution mode or a second resolution mode;
wherein initially, the radar module is operated in the first resolution mode;
wherein in the second resolution mode, the radar module detects a specific portion of the object within the target sensing zone according to the radar setting value;
wherein the target sensing zone corresponds to a cuboid region;
wherein the radar setting value comprises an antenna angle setting value and a PRT (pulse repetition time) setting value.

2. The detection device as claimed in claim 1, wherein the detection device is implemented with an HMD (Head Mounted Display).

3. The detection device as claimed in claim 1, wherein the object is a human body, and the specific portion of the object is a hand portion of the human body.

4. The detection device as claimed in claim 1, wherein in the first resolution mode, if the radar module detects that anything is approaching, the radar module notifies the camera module, such that the camera module is enabled.

5. The detection device as claimed in claim 1, wherein a frame rate of the camera module is lower than or equal to a predetermined value.

6. The detection device as claimed in claim 1, wherein in the first resolution mode, a PRT (Pulse Repetition Time) of the radar module is greater than or equal to a threshold value.

7. The detection device as claimed in claim 6, wherein in the second resolution mode, the PRT of the radar module is smaller than the threshold value.

8. The detection device as claimed in claim 1, wherein after the image processing module finishes analyzing the image, the image processing module controls the radar module to leave the first resolution mode and enter the second resolution mode.

9. The detection device as claimed in claim 1, wherein the radar module comprises:
an antenna array, comprising a plurality of antenna elements; and
a radar controller, controlling a tilt angle of the antenna array according to the radar setting value.

10. A detection method, comprising the steps of:
operating a radar module in a first resolution mode;
obtaining an image of an object by a camera module;
analyzing the image by an image processing module, so as to define a target sensing zone and generate a radar setting value;
operating the radar module in a second resolution mode; and
detecting a specific portion of the object within the target sensing zone according to the radar setting value by the radar module;
wherein the target sensing zone corresponds to a cuboid region;
wherein the radar setting value comprises an antenna angle setting value and a PRT (pulse repetition time) setting value.

11. The detection method as claimed in claim 10, wherein the object is a human body, and the specific portion of the object is a hand portion of the human body.

12. The detection method as claimed in claim 10, further comprising:

in the first resolution mode, if it is detected that anything is approaching, notifying the camera module by the radar module, such that the camera module is enabled.

13. The detection method as claimed in claim 10, wherein a frame rate of the camera module is lower than or equal to a predetermined value.

14. The detection method as claimed in claim 10, wherein in the first resolution mode, a PRT of the radar module is greater than or equal to a threshold value.

15. The detection method as claimed in claim 14, wherein in the second resolution mode, the PRT of the radar module is smaller than the threshold value.

16. The detection method as claimed in claim 10, further comprising:

after the image is completely analyzed, controlling the radar module to leave the first resolution mode and enter the second resolution mode by the image processing module.

\* \* \* \* \*